United States Patent [19]
McSparran

[11] 3,787,727
[45] Jan. 22, 1974

[54] STEPPER MOTOR CONTROL
[75] Inventor: Ray A. McSparran, Endicott, N.Y.
[73] Assignee: International Business Machines Corporation, Armonk, N.Y.
[22] Filed: Dec. 27, 1972
[21] Appl. No.: 319,100

[52] U.S. Cl.................. 318/696, 318/685, 318/440, 318/442, 318/410
[51] Int. Cl. ........................................... H02k 37/00
[58] Field of Search ... 318/696, 685, 415, 440, 442, 318/410

[56] References Cited
UNITED STATES PATENTS
3,445,741  5/1969  Gerber................................. 318/696
3,466,517  9/1969  Leenhauts............................ 318/696
3,626,269  12/1971  Stanley ............................... 318/696

*Primary Examiner*—G. R. Simmons
*Attorney, Agent, or Firm*—George E. Clark

[57] ABSTRACT

A half-step stepper motor control circuit in which the acceleration period is constant independent of whether the advance instruction occurs, (1) when the motor starts from 1 phase energization, or (2) when the motor starts from 2 phase energization, and the deceleration period is constant and independent of whether (1) the motor stops in 1 phase energization or (2) the motor stops in 2 phase energization.

5 Claims, 5 Drawing Figures

3,787,727

STEPPER MOTOR CONTROL

BACKGROUND OF THE INVENTION

It has been recognized that the acceleration period of a full step stepper motor can be shortened by increasing the current through the motor windings during the acceleration period and it has also been recognized that to prevent over-shoot in arriving at the new position, a motor may have the frequency of its step signals reduced during the deceleration period (see, for example, U. S. Pat. No. 3,523,230 issued to J. D. York on Aug. 4, 1970).

In many stepper motor applications it is desirable to operate the motor in half-step manner, that is, not merely one of its four stator windings are energized at a time but to achieve twice the number of stable positions, two stator windings are simultaneously energized for half-step positions. When a stepper motor is operated in half-step manner, the torque applied to the motor varies in accordance with whether one or two windings are energized unless appropriate steps are taken. When the current position of the motor is such that two windings are simultaneously energized, then the first acceleration step will result from only one winding being energized whereas if the current position is such that only one winding is energized, then the first acceleration step will result from two windings being simultaneously energized. These different starting conditions will result in different length time periods for the motor to arrive at normal running speed unless proper steps are taken. Also, during deceleration of a half-step motor the energization of the windings should be varied in accordance with whether the motor is to stop in 1 phase or 2 phase and the frequency of step pulses should be varied according to whether the motor is to stop in 1 phase or 2 phase.

SUMMARY OF THE INVENTION

In accordance with the principles of this invention a half-step control for the stepper motor is provided with start-stop controls which (1) during start-up relatively high voltage is applied to the motor windings for time periods whose duration is dependent upon whether the first step of the motor is to be energized by 1 phase or 2 phase and (2) during deceleration relatively high voltage is applied to the windings for time periods whose duration is dependent upon whether the motor is to stop in 1 phase or 2 phase and during the deceleration period the stepping pulses are time-spaced according to whether the motor is to stop with 1 or 2 phases energized.

It is an object of this invention to provide a motor with a control circuit in which the acceleration and deceleration periods are substantially the same regardless of whether the motor starts or stops in 1 phase or 2 phase energization.

DESCRIPTION OF THE PREFERRED EMBODIMENT

Figure 1:
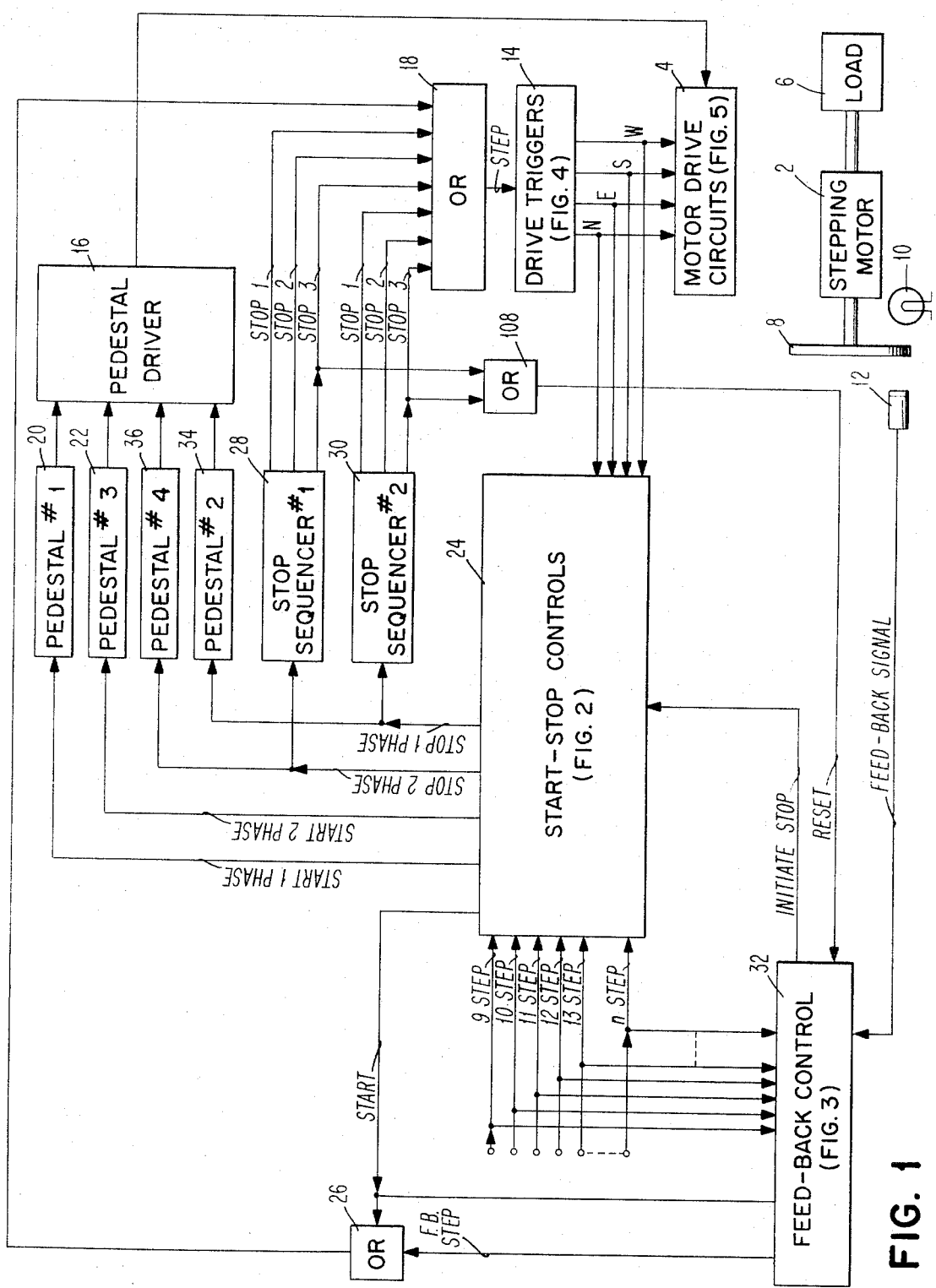
FIG. 1 is a simplified block diagram of a half-step and its controls constructed in accordance with the principles of this invention.

Referring now to FIG. 1, there is illustrated in simplified block diagram form a half-step motor control arrangement employing the principles of this invention. A stepper motor 2 having motor drive circuits 4 moves a load 6 and also rotates a feedback disc 8. The stepper motor 2 is of conventional construction having four bifilar wound stator poles, each having many teeth and the permanent magnet rotor also has many such teeth. In the preferred embodiment the number of stator teeth and the number of rotor teeth are chosen such that the motor has 1.8° rotation for each full step or 0.9° for half-step, or 400 half-step stable positions (sometimes called detent positions). The feedback disc 8 is also of conventional construction and provided with 400 index marks around and near the periphery thereof. Those 400 index marks in combination with a light source 10 and a photocell 12 produce feedback signals for each 0.9° of rotation of the stepper motor 2.

The energization of the motor drive circuits 4 under control of a set of drive triggers 14 and a pedestal driver 16, the details of which will be described later. The drive triggers 14, in response to step pulses from an OR circuit 18 cause windings of the motor to be energized in 1 phase or 2 phase in a predetermined sequence. If, for example, the states of the drive triggers 14 are such as to cause only the conductor N to be energized and the stepping motor is in its home, or zero, position and it is desired to move the motor several degrees (multiples of 0.9°) in a clockwise direction, then several pulses would be applied to the drive triggers 14. In response to the first one of the step pulses, the states of the drive triggers would be changed so that the conductor E as well as the conductor N is energized and thereby cause the stepper motor 2 to move one half-step, or 0.9°. The second STEP pulse would cause the drive triggers to energize only the E conductor, the third STEP pulse would cause the drive triggers to energize the S and the E conductors, the fourth STEP pulse would cause only the S conductor to be energized, etc.

When such a stepper motor has only one winding energized there is considerable less torque applied to the rotor than when two windings are energized. Because variations in amount of torque occur in stepper motors operated in half-step manner, over-shoot or hunting will occur unless adequate steps are taken. Also, because of the variations in torque in half-steps for the motor to reach normal velocity on start-up dependent upon what position it started from, adequate steps must be taken if the normal running speed is to be reached at an optimum time.

In accordance with the principles of this invention the problems of start-up caused by variation of torque in half-step motors is compensated by varying the current in the motor windings during start-up dependent upon whether it starts in 1 phase or 2 phase and the problems of stop caused by variations of torque in half-step motors is compensated by changing the rate of STEP pulses as well as current amplitude in the windings during stop time dependent upon whether the motor is to stop in 1 phase or 2 phase.

It will be seen in FIG. 1 that the motor drive circuits 4 are controlled by the pedestal driver 16. The pedestal driver 16 receives signals from either pedestal No. 1 circuit 20 or pedestal No. 3 circuit 22 during start-up time dependent upon whether a start-stop controls device 24 delivers a signal on its output marked start 1 phase or on its output marked start 2 phase. Since the start-stop device 24 receives input signals from the drive triggers 14 on conductors N, E, S, W it is able to determine the current state of those triggers at the time start-up is initiated.

It will also be seen from FIG. 1 that the drive triggers 14 are driven by STEP pulses from OR circuit 18 which respond not only to pulses passed by an OR circuit 26 but also from a stop sequencer No. 1 circuit 28 and a stop sequencer No. 2 circuit 30. Start-stop controls circuit 24 as well as feedback control circuit 32 receive input signals as to how many steps are to be taken by the stepper motor 2.

The start-stop controls circuit 24 upon receipt of a move instruction (a signal on any one of the lines labelled 9 step, 10 step, 11 step, 12 step, 13 step —n step) and upon receipt of signals (N, E, S, W) from the drive triggers produces signals in the sequence indicated:

1. Start 1 phase — If only one of the outputs of the drive triggers (N. E. S, W) is energized when the instruction to move is received, or Start 2 phase — If two outputs of drive triggers (N, E, S, W) are energized when the instruction to move is received, 2. Start 3. Stop 1 phase — If (1) drive triggers were in 2 phase when the instruction to move was received and the instruction was for an odd number of steps, or (2) the drive triggers were in 1 phase when the instruction was received and the instruction was for an even number of steps, or Stop 2 phase — If (1) drive triggers were in 1 phase when the instruction to move was received and the instruction was for an odd number of steps, or (2) the drive triggers were in 2 phase when the instruction to move was received and the instruction was for an even number of steps.

When the start-stop controls circuit 24 produces a signal on the start 1 phase conductor, the pedestal No. 1 circuit 20 produces a signal that causes pedestal driver 16 to energize the motor drive circuits 4 with the high voltage (+60 volts) for a relatively short time since the first move will produce a relatively high torque (2) phase windings will be energized), whereas when the start 2 phase conductor is energized, the pedestal No. 3 circuit 32 produces a signal that causes pedestal driver 16 to energize the motor drive circuits 4 with high voltage (+60 volts) for a relatively long time since the first move will produce a relatively low torque (1) phase energized). The design of the pedestal circuits, the pedestal driver and the motor drive circuits are preferably such that the motor will arrive at normal running speed in about three half-steps regardless of whether it starts in single or double phase.

The start pulse from the start-stop controls circuit 24 occurs at the same time or shortly after the start 1 phase or start 2 phase signals and is transmitted through OR circuit and OR circuit 18 to cause the drive triggers 14 to assume the next state and thereby advance the stepper motor the first half-step of the move.

After the stepper motor 2 has advanced the first half-step in response to the start signal then the feedback control 32 in response to feedback signals causes stepping signals to be transmitted through OR circuit 26 and OR circuit 18 to the drive triggers 14 and thereby produce half-steps of the motor. Since the feedback control 32 includes a counter and receives the move instruction (9 step, 10 step, 11 step, 12 step, 13 step —n step), it is able to stop its step signals when the number of feedback signals received after the start signal is equal to $n - 3$ where $n$ equals the total number of steps in the instruction. At the time that the feedback control 32 ceases to issue step signals in response to an instruction to move, it produces a signal on the initiate stop conductor.

An initiate stop signal produced by the feedback control 32 is received by the start-stop controls device 24 and in response to that signal it produces a signal on either the the stop 1 phase or the stop 2 phase conductor as previously mentioned. When the stop 1 phase signal is produced (start 2 phase and step an odd number of steps, or start 1 phase and step an even number of steps) a relatively short pulse is produced by pedestal No. 2 circuit 34 and stop sequencer No. 2 circuit 32 delivers a pulse on each of the conductors labelled stop No. 1, stop No. 2, and stop No. 3 which are spaced relatively close in time, whereas, when the stop 2 phase signal is produced by the start-stop controls device 24, a relatively long pulse is produced by pedestal No. 4 circuit 36 and stop sequencer No. 1 circuit 28 delivers a pulse on each of the conductors stop No. 1, stop No. 2, stop No. 3 which are spaced relatively far apart in time.

In the above described manner, the half-step motor is controlled to reach normal running speed in about five half-steps regardless of whether it starts in 1 phase or 2 phase and the deceleration is controlled so that it will stop without over-shoot regardless of whether it is to stop in 1 phase or 2 phase.

Start-Stop Controls

Figure 2:
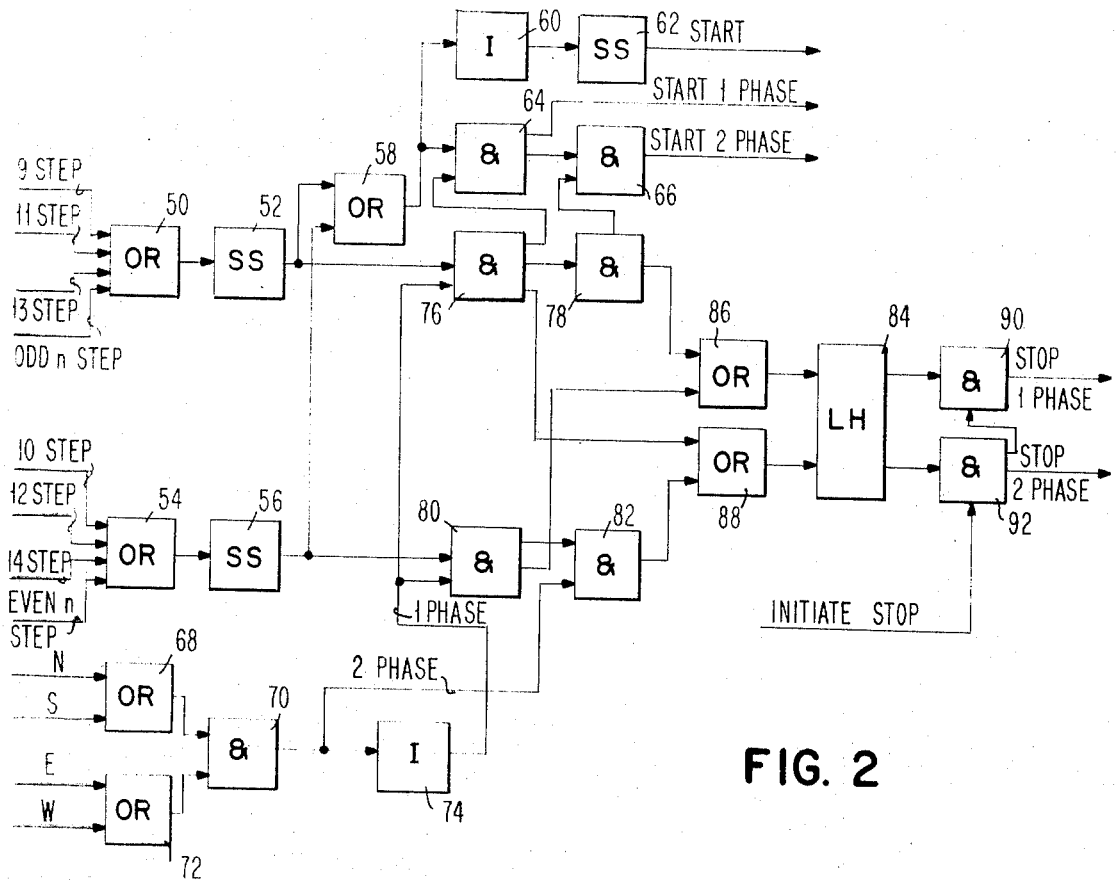
FIG. 2 is a logic diagram of the start-stop controls indicated at 24 in FIG. 1.

Referring now to FIG. 2 there is shown in logic diagram form the start-stop control device indicated at 24 in FIG. 1. When an instruction to move an odd number of steps is received it is delivered through an OR circuit 50 to cause transition of a single shot 52 for a predetermined time period (dependent upon the time constants involved), whereas, if the instruction is to move an even number of steps then the signal is delivered through an OR circuit 54 to cause similar operation of a single shot 56. A negative transition of either of the single shots 52, 56 is delivered through an OR circuit 58 and inverted by inverter 60 to start a single shot 62. The circuit thus far described causes a start signal to be produced a predetermined time after the instruction to move has been received.

An OR circuit 68 receives N and S signals and therefore conditions one leg of an AND circuit 70 when either of the N or S windings of the stepper motor are energized. An OR circuit 72 receives E and W signals when either of the E or W windings of the stepper motor are energized and therefore condition the other leg of AND circuit 70 accordingly. If any one of the conductors N, E, S, W are energized exclusively then the AND circuit 70 will produce a negative signal which through an inverter 74 will produce a positive signal on the conductor labelled 1 phase whereas if the N or S windings of the motor is simultaneously energized with either the E or W winding AND circuit 70 will deliver a positive signal to the conductor labelled 2 phase.

From the above description it can be seen that when any instruction is received by the start-stop control device, it delivers a pulse on the start conductor after a suitable delay period. The output of OR circuit 58 is applied to one leg of each of two AND circuits 64 and 66 the legs of which are conditioned by the conductor labelled 1 phase and 2 phase, respectively. After single shot 52 or 56 has timed out either AND circuit 64 will produce a signal on the conductor labelled start 1 phase or AND circuit 66 will produce a signal on the conductor labelled start 2 phase. The signal on the conductor labelled start initiates the first step of the stepper motor. A signal on the conductor labelled start 1 phase causes the pedestal No. 1 circuit 20 (FIG. 1) to produce a pulse which is relatively short in duration since the first step of the motor is to be 2 phase energization producing less torque whereas a signal on the conductor labelled start 2 phase causes the pedestal No. 2 circuit 22 (FIG. 1) to produce a pulse which is relatively long in duration since the first step of the motor is to be 1 phase energization and will produce more torque.

Shortly after an instruction to move has been received and before the stepper motor has had a change to make its first step, one of a pair of AND circuits 76, 78 or one of a pair of AND circuits 80, 82 causes a latch 84 to either set or reset. Latch 84 is set from the output of AND circuits 78, 80 through an OR circuit 86 therefor the latch will be set when (1) the motor starts from 2 phase is to move an odd number of steps, or (2) the motor starts from 1 phase and is to move an even number of steps. The latch 84 is reset by the output of AND circuits 76, 82 through an OR circuit 88 therefor the latch will be reset when (1) the motor starts from 1 phase and is to move an odd number of steps, or (2) the motor starts from 2 phase and is to be moved an even number of steps.

Latch 84 is therefor set or reset at the time of the instruction to move according to whether the motor is to stop in 2 phase or 1 phase. A signal on the conductor labelled initiate stop conditions one leg of a pair of AND circuits 90, 92 the other legs of which are conditioned by the set and reset outputs of latch 84, respectively. The output of AND circuit 90 produces a signal on the conductor labelled stop 2 phase and the output of AND circuit 92 produces a signal on the conductor labelled stop 1 phase.

Feedback Control

Figure 3:
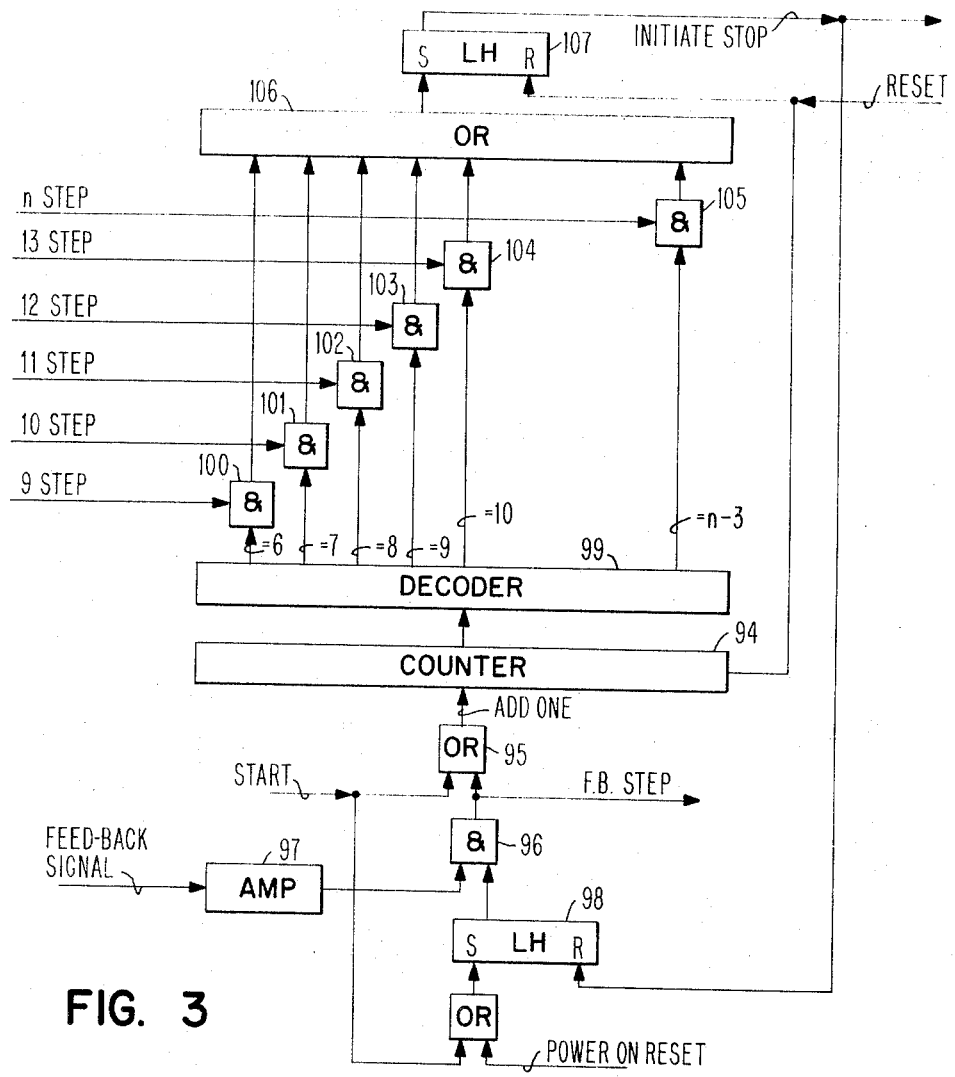
FIG. 3 is a logic diagram of the feedback control indicated at 32 in FIG. 1.

Referring now to FIG. 3 there is illustrated in logic diagram form the feedback control indicated at 32 in FIG. 1. A counter 94 is stepped through an OR circuit 95 by signals on the conductor labelled start as well as through an AND circuit 96 by signals on the feedback conductor after being suitably amplified and shaped by an amplifier 97. Feedback signals are passed by the AND circuit 96 following the start signal since a latch 98 is set by start signals to thereby condition the other leg of AND circuit 96.

It will be seen that when an instruction to move has been received, the start-stop controls device 24 (FIG. 2) produces the start pulse which causes the stepper motor to make the first step of the move and then the feedback control (FIG. 3) produces subsequent step signals. The start signal and feedback step signals are counted by counter 94 which may be of conventional design and the state of the counter 94 is decoded by a conventional decoder 99. The outputs of the decoder 99 are labelled =6, =7, =8, =9, =10, —, =n −3 and condition one leg of AND circuits 100, 101, 102, 103, 104, 105, respectively. The other legs of those AND circuits are conditioned by conductors labelled 9 step, 10 step, 11 step, 12 step, 13 step, —, n step, respectively. Accordingly, when the sum of a start signal plus a series of feedback signals equals 3 less than the number of steps in the instruction, a signal will be delivered through an OR circuit 106 to set a latch 107 so that a signal will be delivered to the conductor labelled initiate stop. The initiate stop signal is delivered to the start-stop control device 24 (FIG. 2) and that signal also resets latch 98 (FIG. 3) to prevent further feedback step signals from being produced. It will be recalled from the preceding description relating to FIGS. 1 and 2 that the initiate stop signal causes the start-stop control device to produce a signal stop 1 phase or a signal stop 2 phase and those signals cause operation of stop sequencer No. 2 or stop sequencer No. 1, respectively. Those stop sequencers produce the final 3 step signals of a move and the last step signal (stop No. 3) from those stop sequencers is delivered through an OR circuit 108 (FIG. 1) to the conductor labelled reset. The reset signal causes counter 94 (FIG. 3) and latch 107 to be reset in readiness for the next move instruction.

Drive Triggers

Figure 4:
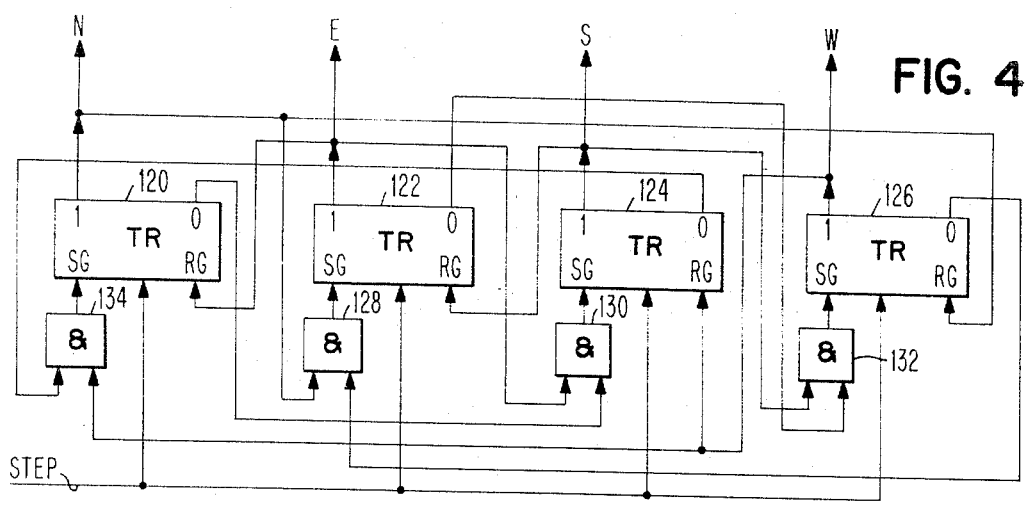
FIG. 4 is a logic diagram of the drive triggers indicated at 14 in FIG. 1.

Referring now to FIG. 4 there is illustrated a logic diagram of the drive triggers indicated at 14 in FIG. 1. Trigger circuits 120, 122, 124, 126 receive pulses on the conductor labelled step and dependent upon the particular states of those triggers the output conductors labelled N, E, S, W are energized. Trigger 120, in its ONR state, conditions one leg of an AND circuit 128 the other leg of which is conditioned by the ZERO output of trigger 126. Trigger 122, in its ONE state, conditions one leg of an AND circuit 130 the other leg of which is conditioned by the ZERO output of trigger 120. Trigger 124, in its ONE state, conditions one leg of an AND circuit 132 the other leg of which is conditioned by the ZERO output of trigger 122. Trigger 126, in its ONE state, conditions one leg of an AND circuit 134 the other leg of which is conditioned by the ZERO output of trigger 124.

The output of AND circuits 134, 128, 130, 132 are applied as gating signals to the SET gates of triggers 120, 122, 124, 126, respectively. The RESET gates of triggers 120, 122, 124, 126 are conditioned by the ONE outputs of triggers 122, 124, 126, and 120, respectively.

Assuming that trigger 120 is in its ONE state to thereby energize the output conductor labelled N and a STEP pulse is received, trigger 122 will be set in its ONE state thereby energizing the E conductor as well as the N conductor. The second STEP pulse will cause trigger 120 to assume its ZERO state thereby leaving only the E energized. Succeeding STEP pulses will cause the triggers to assume various states thereby energizing the output conductors as indicated in the following table:

Table 1

|  | Output Conductors Energized | | | |
|---|---|---|---|---|
|  | N | E | S | W |
| Initial State | x | | | |
| Step 1 | x | x | | |
| Step 2 | | x | | |
| Step 3 | | x | x | |
| Step 4 | | | x | |
| Step 5 | | | x | x |
| Step 6 | | | | x |
| Step 7 | x | | | x |
| Step 8 | x | | | |

As long as STEP pulses are applied to the drive triggers they will continue to cycle in the manner shown in Table 1.

Motor Drive Circuits

Figure 5:
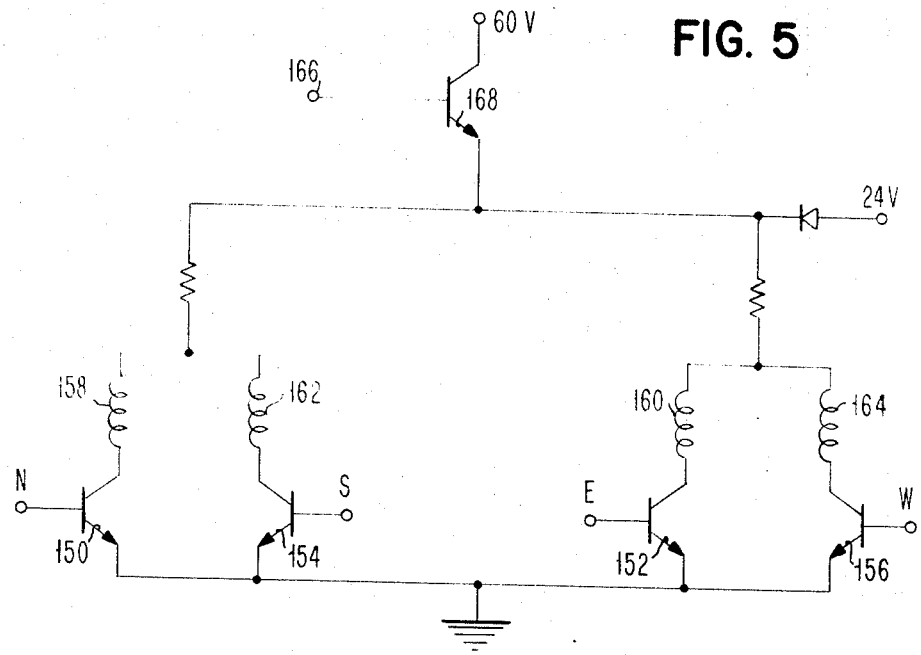
FIG. 5 is a simplified schematic of the motor drive circuits indicated at 4 in FIG. 1.

Referring now to FIG. 5 there is illustrated in schematic form the motor drive circuits indicated at 4 in FIG. 1. The N, E, S, W outputs of the drive triggers indicated at 14 in FIG. 1 and shown in FIG. 4, are applied to transistors 150, 152, 154, 156, respectively. Those transistors control current through the motor windings 158, 160, 162, 164, respectively and normally have 24 volts applied thereto which results in relatively low current through the windings. The pedestal driver (indicated at 16, FIG. 1) selectively applies signals to the input 166 to cause 60 volts to be applied to the motor windings through a transistor 168.

With the circuit arrangement of the motor drive circuits shown in FIG. 5 pedestal pulses can be selectively applied to the input 166 to increase current in the motor windings and thereby control the torque driving start-up and during deceleration dependent upon if the motor is to start or stop in 1 phase or 2 phase.

While the invention has been particularly shown and described with reference to a preferred embodiment thereof, it will be understood by those skilled in the art that various changes in form and details may be made therein without departing from the spirit and scope of the invention.

What is claimed is:

1. A half-step control system for a stepper motor having stator poles with windings and a rotor, said stator poles and said rotor each having a plurality of teeth, said control system comprising;
   a. a start-stop control circuit responsive to a signal representative of an instruction to move a predetermined number of half-steps for producing a start signal and responsive to an initiate stop signal for producing (1) a stop 1 phase signal if the motor is to have only one of its subwindings to be energized at the completion of the instruction to move, and (2) a stop 2 phase signal if the motor is to have two of its subwindings to be energized at the completion of the instruction to move,
   b. a feedback control responsive to said start signal and to said instruction to move signal for producing feedback step signals equal in number to the number of steps represented by the move instruction signal minus $n$ where $n$ is a selected positive integer and for producing said initiate stop signal,
   c. a first stop sequencer responsive to said stop 1 phase signal for producing a series of stop signals equal in number to said selected $n$,
   d. a second stop sequencer pulse generator responsive to said stop 2 phase signal for producing said selected $n$ number of stop signals, and
   e. means responsive to said start signal, said feedback step signals, and said stop signals for energizing said windings in half-step sequence.

2. A half-step control system according to claim 1, further including;
   a. a first pedestal circuit responsive to said stop 1 phase signal for controlling the current in said subwindings for a first predetermined time period, and
   b. a second pedestal circuit responsive to said stop 2 phase signal for controlling the current in said windings for a second predetermined time period, whereby the deceleration period is constant whether the motor stops with one phase or two phases energized.

3. A half-step control system according to claim 1, wherein said start-stop control circuit further includes means responsive to said move signal to produce a start 1 phase signal when only one winding is energized when the move signal is received and to produce a start 2 phase signal when two windings are energized when the move signal is received and further including;
   a. a first pedestal circuit responsive to said start 1 phase signal for controlling the current in subwindings for a first predetermined time period, and
   b. a second pedestal circuit responsive to said start 2 phase signal for controlling the current in subwindings for a second predetermined time period, whereby the deceleration period is constant whether the motor starts with one phase or two phases energized.

4. A half-step control system for a stepper motor having stator poles with windings and a rotor, said stator poles and said rotor each having a plurality of teeth, said control system comprising;
   a. a start-stop control circuit responsive to a signal representative of an instruction to move a predetermined number of half-steps for producing a (1) start 1 phase signal if only one of said windings is energized when the move signal is received, and (2) start 2 phase signal if two of said windings are energized when the move signal is received,
   b. a first pedestal circuit responsive to said start 1 phase signal for controlling the current in subwindings for a first predetermined time period, and
   c. a second pedestal circuit responsive to said start 2 phase signal for controlling the current in subwindings for a second predetermined time period, whereby the deceleration period is constant whether the motor starts with one phase or two phases energized.

5. A half-step control system for a stepper motor having stator poles with windings and a rotor, said stator poles and said rotor each having a plurality of teeth, said control system comprising;
   a. a start-stop control circuit responsive to a signal representative of an instruction to move a predetermined number of half-steps for producing a start signal and responsive to an initiate stop signal for producing (1) a stop 1 phase signal if the motor is to have only one of its subwindings to be energized at the completion of the instruction to move, and (2) a stop 2 phase signal if the motor is to have two of its subwindings to be energized at the completion of the instruction to move, b. a first pedestal circuit responsive to said stop 1 phase signal for controlling the current in said sub-windings for a first predetermined time period, and
c. a second pedestal circuit responsive to said stop 2 phase signal for controlling the current in subwindings for a second predetermined time period, whereby the deceleration period is constant whether the motor stops with one phase or two phases energized.

* * * * *